(12) United States Patent
Jung

(10) Patent No.: US 11,712,979 B2
(45) Date of Patent: Aug. 1, 2023

(54) CONTAINER TRAILER VEHICLE WITH REPLACEABLE BATTERY

(71) Applicant: Sungwook Jung, Busan (KR)

(72) Inventor: Sungwook Jung, Busan (KR)

( * ) Notice: Subject to any disclaimer, the term of this patent is extended or adjusted under 35 U.S.C. 154(b) by 0 days.

(21) Appl. No.: 18/074,504

(22) Filed: Dec. 4, 2022

(65) Prior Publication Data

US 2023/0182613 A1 Jun. 15, 2023

(30) Foreign Application Priority Data

Dec. 13, 2021 (KR) ........................ 10-2021-0178066

(51) Int. Cl.
| | |
|---|---|
| *B60L 53/80* | (2019.01) |
| *B60L 7/10* | (2006.01) |
| *B60L 50/60* | (2019.01) |
| *B60L 50/64* | (2019.01) |

(52) U.S. Cl.
CPC ................ *B60L 53/80* (2019.02); *B60L 7/10* (2013.01); *B60L 50/64* (2019.02); *B60L 50/66* (2019.02); *B60L 2200/28* (2013.01)

(58) Field of Classification Search
CPC .. B60L 53/80; B60L 7/10; B60L 50/64; B60L 50/66; B60L 2200/28
See application file for complete search history.

(56) References Cited

FOREIGN PATENT DOCUMENTS

| | | | |
|---|---|---|---|
| CN | 101100184 A | 1/2008 | |
| JP | H09-284901 A | 10/1997 | |
| JP | H11-273982 | 10/1999 | |
| KR | 10-2013-0086758 | 8/2013 | |
| KR | 10-2014-0135801 | 11/2014 | |
| KR | 10-2018-0025846 | 3/2018 | |
| KR | 10-2020-0013474 | 2/2020 | |
| WO | WO-2013143460 A1 * | 10/2013 | ............... B60K 1/04 |
| WO | WO-2021191404 A1 * | 9/2021 | ............. B60R 16/04 |

OTHER PUBLICATIONS

English Specification of 10-2018-0025846.
English Specification of JPH09-284901A.
English Specification of CN101100184 A.
English Specification of 10-2014-0135801.
English Specification of 10-2020-0013474.
English Specification of 10-2013-0086758.
English Specification of JPH11-273982.

* cited by examiner

*Primary Examiner* — Jacob B Meyer
(74) *Attorney, Agent, or Firm* — Antonio Ha & U.S. Patent, LLC

(57) ABSTRACT

An embodiment of the present disclosure relates to a container trailer vehicle equipped with a replaceable battery, and an embodiment of the present disclosure provides a container trailer vehicle capable of minimizing the use of a truck engine and multi-stage transmission by installing an auxiliary drive unit equipped with an electric motor, generator and replaceable battery on the trailer and driving the semi-trailer vehicle with the electric motor when necessary.

6 Claims, 10 Drawing Sheets

CONTAINER TRAILER VEHICLE WITH REPLACEABLE BATTERY

CROSS-REFERENCE TO RELATED APPLICATION(S)

This application claims priority to Korean Patent Application No. 10-2021-0178066 filed in the Korean Intellectual Property Office on Dec. 13, 2021, the disclosure of which is incorporated by reference herein in its entirety.

TECHNICAL FIELD

An embodiment of the present disclosure relates to a container trailer vehicle equipped with a replaceable battery.

DISCUSSION OF RELATED ART

In recent years, maritime transportation has been frequently carried out from the viewpoint of internationalization of logistics and mass transport, and marine containers have been transported in large quantities with such maritime transportation. Transport using containers is not limited to maritime transportation using ships but also land transport using public mass transport networks such as railroads, thereby contributing to the suppression of $CO_2$ emissions that cause global warming.

A full trailer and a semi-trailer are mainly used for container transport. For example, a full trailer is a trailer equipped with a towing port, a tractor at the tip designed to support the total load only with the trailer. Because Korean roads have many curved sections, they are not used as much. Instead, they are abundantly used in the United States and Canada. As another example, a semi-trailer is a trailer connected to a tractor to transport cargo, designed so that a portion of the total load is supported by a towing vehicle. A semi-trailer has one or more rear axles and one or more axles that support its vehicle weight and a significant portion of the total weight of its cargo on a semi-trailer tractor fitted with a connector. A semi-trailer has the advantage of transporting diverse cargoes and being easy to drive.

In container transport, while carrying out transport in cooperation with other mass means of transport and limited transport by semi-trailer (limited to transportation getting off the ship and loading onto the ship to the container yard, transporting from the container yard to the railroad base, transporting from the container yard to the shipper, and the like), which further contributes to the suppression of $CO_2$ emission. Additionally, since the traveling pattern of the semi-trailer is limited to some extent in their movement, the operation schedule of the semi-trailer can be easily adjusted.

Moreover, the transport of a semi-trailer is limited to a standardized marine container that can be loaded, or its equivalence, due to the trailer's structure. Thus, when having return containers, it tows them back to the container yard or port facility. In addition, there are cases where the container is towed back in a state where no container is loaded, or the container is removed, and the vehicle is driven only by a truck (or tractor head).

However, in the semi-trailer operation, the loading state of the container during transport, the state of loading empty containers when returning home after transport, or the load of the truck towing the trainer in the state that the container is not loaded are significantly different.

Nevertheless, in the conventional semi-trailer, the truck is equipped with a large engine (internal combustion engine) with a large displacement with high output and a large multi-speed transmission suitable for the output of this engine to tow a trailer loaded with a heavy container.

As a result, when driving with only a truck, when driving a truck with air mass not carrying a container, or by towing with an empty container loaded, its engine output is clearly different from the running condition when loading cargo. It is an engine with large, rated output, so it is operated with a low output. In such a low-output state, a gear stage necessary for starting in a cargo-loaded state becomes unnecessary, and a large multi-stage transmission is also unnecessary.

In other words, in the driving operation of the semi-trailer loaded with containers carried with cargo, a large displacement engine and a large multi-stage transmission are required. However, driving only trucks or semi-trailers in air mass or empty container loading conditions is made possible with a small displacement engine and a small multi-stage transmission.

In recent years, to solve the cause of global warming, a semi-trailer equipped with a conventional large engine is also avoided as much as possible because it is desirable to suppress the emission of $CO_2$ even in ports and other facilities. It is preferable to use a semi-trailer equipped with a driving device combining a small-output engine and a small multi-stage transmission.

Meanwhile, the semi-trailer has only a structure such as an axle, a wheel, and a brake system in the lower part of the frame, so there is a lot of space.

The above-described information disclosed in the related art of the present disclosure is only for improving the understanding of the background of the present disclosure and thus may include information that does not constitute the prior art.

SUMMARY

An embodiment of the present disclosure is to provide a container trailer vehicle equipped with a replaceable battery. As an example, in order to address issues of the trailer in the prior art and the issue of the driving method using a trailer such as a sea container, an embodiment of the present disclosure provides a container trailer vehicle capable of minimizing the use of a truck engine and multi-stage transmission by installing an auxiliary drive unit equipped with an electric motor, generator and replaceable battery on the trailer and driving the semi-trailer vehicle with the electric motor when necessary.

The container trailer vehicle equipped with a replaceable battery according to an embodiment of the present disclosure may comprise a battery box installed with a case and a door at the bottom of the container trailer; a battery module detachably installed in the case through the door of the battery box; a battery door lock installed on the side of the battery box to enable opening and closing of the door from the case; an automatic door open actuator installed on the upper surface of the battery box to automatically open and close the door from the case; a display installed on the upper part of the battery box to display a remaining battery level, a drivable distance, whether the battery door is locked, the number of times of error detection, and a battery temperature; a generator installed on a wheel of the container trailer to charge the battery module; and drive motors respectively installed on the axis of the truck connected to the container trailer and the axis of the container trailer to rotate the axis by the battery module.

The battery module may comprise a plurality of battery cells connected in series or in parallel; a housing surrounding the battery cells; a charging/discharging terminal installed in the housing to charge the battery cells or to discharge the battery cells; and a pair of lift grooves installed in the lower part of the housing to couple a forklift.

The case of the battery box may further comprise a guide groove installed in the width direction on each of an upper part and a lower part of a side thereof, and the housing of the battery module may further comprise a guide protrusion installed in the width direction on each of an upper part and a lower part of a side thereof. The guide protrusion of the housing of the battery module may be coupled to the guide groove of the case of the box.

The guide groove may be provided with a groove from the inside to the outside, and the guide protrusion is provided with a protrusion from the inside to the outside.

The container trailer vehicle may further comprise a battery cable connected to the battery module; a motor cable connected to a drive motor installed on the axis of the truck; and a cable connector coupling or separating the battery cable and the motor cable from each other.

The battery door lock may comprise an electric motor coupled to the side of the case; and a lock plate coupled to a rotary axis of the electric motor to be coupled to or separated from the front surface of the door.

The automatic door open actuator may comprise a pneumatic cylinder, the pneumatic cylinder comprising: a cylinder barrel coupled to the upper surface of the case; and a piston rod extending from the cylinder barrel and coupled to the upper surface of the door.

The battery box may further comprise a temperature sensor. When the temperature of the battery module is higher than the reference temperature while the container trailer vehicle is running, the battery door lock may operate to make the door openable, and then the automatic door open actuator may operate to open the door automatically.

The generator may be connected to a rotary axis coupled to the wheel axis of the trailer through a gear device. When a driver steps on an accelerator pedal, the gear device may separate the wheel axis and the rotary axis to prevent the generator from operating, and when the driver steps on a decelerator pedal, the gear device may couple the wheel axis and the rotary axis to operate the generator.

An embodiment of the present disclosure provides a container trailer vehicle equipped with a replaceable battery. As an example, in order to address issues of the trailer in the prior art and the issue of the driving method using a trailer such as a sea container, an embodiment of the present disclosure provides a container trailer vehicle capable of minimizing the use of a truck engine and multi-stage transmission by installing an auxiliary drive unit equipped with an electric motor, generator and replaceable battery on the trailer and driving the semi-trailer vehicle with the electric motor when necessary.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
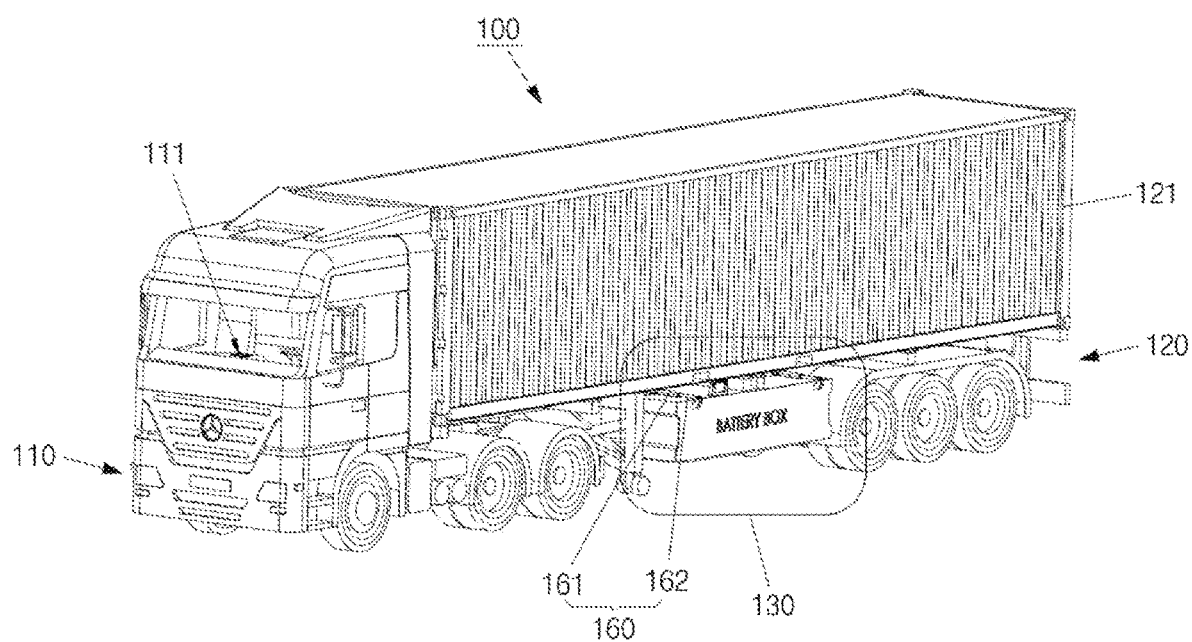
FIG. 1 is a perspective view illustrating a container trailer vehicle equipped with a replaceable battery according to an embodiment of the present disclosure.

Hereinafter, preferred embodiments of the present disclosure will be described in detail with reference to the accompanying drawings.

Embodiments of the present disclosure are provided to more completely explain the present disclosure to those of ordinary skill in the art. The following embodiments may be modified in various other forms, and the scope of the present disclosure is not limited to the following embodiments. Rather, these embodiments are provided so that this disclosure will be more thorough and complete, and these embodiments are provided to fully convey the spirit of the present disclosure to those skilled in the art.

In addition, the thickness or size of each layer in the following drawings may be exaggerated for convenience and clarity of explanation. In the drawings, like reference numerals refer to like elements. The term "and/or" used herein includes any one and all combinations of one or more of those listed items. In addition, the term "connected" used herein means not only when member A and member B are directly connected, but also when member A and member B are indirectly connected by interposing member C between member A and member B.

The terminology used herein is used to describe specific embodiments and is not intended to limit the present disclosure. As used herein, the singular form may include the plural form unless the context clearly dictates otherwise. Further, the term "comprise, include" and/or "comprising, including" used herein specifies the presence of the referenced shapes, numbers, steps, actions, members, elements, and/or groups thereof but does not preclude the presence or addition of one or more other shapes, numbers, steps, actions, members, elements and/or groups.

It is apparent that the terms "first," "second," etc. are used herein to describe various members, parts, regions, layers and/or portions, but these members, parts, regions, layers, and/or portions are limited by these terms. These terms are used only to distinguish one member, component, region, layer or portion from another member, component, region, layer or portion. Accordingly, a first member, component, region, layer, or portion described below may refer to a second member, component, region, layer or portion without departing from the teachings of the present disclosure.

Space-related terms such as "beneath", "below", "lower", "above", and "upper" may be used for easy understanding of one element or feature that is different from one element or feature shown in the drawings. These space-related terms are for easy understanding of the present disclosure according to various process conditions or usage conditions of the present disclosure and are not intended to limit the present disclosure. For example, if an element or feature in the drawings is turned over, an element or feature described as "beneath" or "below" becomes "above" or "upper." Accordingly, "below" is a concept encompassing "above" or "below."

Further, the control unit (controller) and/or other related devices or components according to the present disclosure may be implemented using any suitable hardware, firmware (e.g., application-specific semiconductors), software, or a suitable combination of software, firmware and hardware. For example, various components of a control unit (controller) and/or other related devices or components according to the present disclosure may be formed on one integrated circuit chip or on separate integrated circuit chips. Further, various components of the control unit (controller) may be implemented on a flexible printed circuit film, or may be formed on a tape carrier package, a printed circuit board, or the same substrate as the control unit (controller). Further, various components of the control unit (controller) may be processes or threads executing in one or more processors in one or more computing devices, and it may execute computer program instructions and interact with other components to perform various functions mentioned below. The computer program instructions are stored in a memory that can be executed in a computing device using a standard memory device such as a random access memory. The computer program instructions may also be stored in other non-transitory computer readable media, such as a CD-ROM, flash drive, or the like. Further, it should be appreciated by those skilled in the art related to the present disclosure that the functions of various computing devices are combined with each other or integrated into one computing device, or the functions of a particular computing device may be distributed in one or more other computing devices without departing from an exemplary embodiment of the present disclosure.

For example, the control unit (controller) according to the present disclosure may be run on a commercial computer which is composed of a central processing unit, a mass storage device such as a hard disk or a solid-state disk, a volatile memory device, an input device such as a keyboard or mouse, and an output device such as a monitor or printer.

Figure 2A:
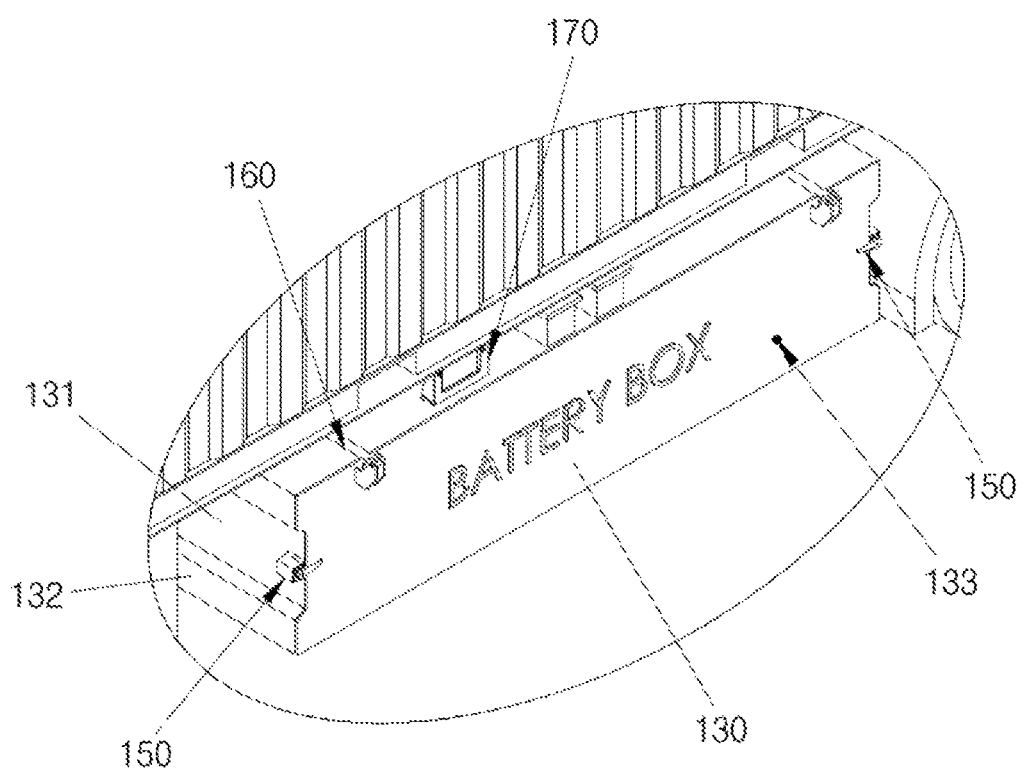
FIG. 2A, FIG. 2B and FIG. 2C are views illustrating a battery box, a display, and a battery door lock in a container trailer vehicle equipped with a replaceable battery according to an embodiment of the present disclosure.
Figure 2B:
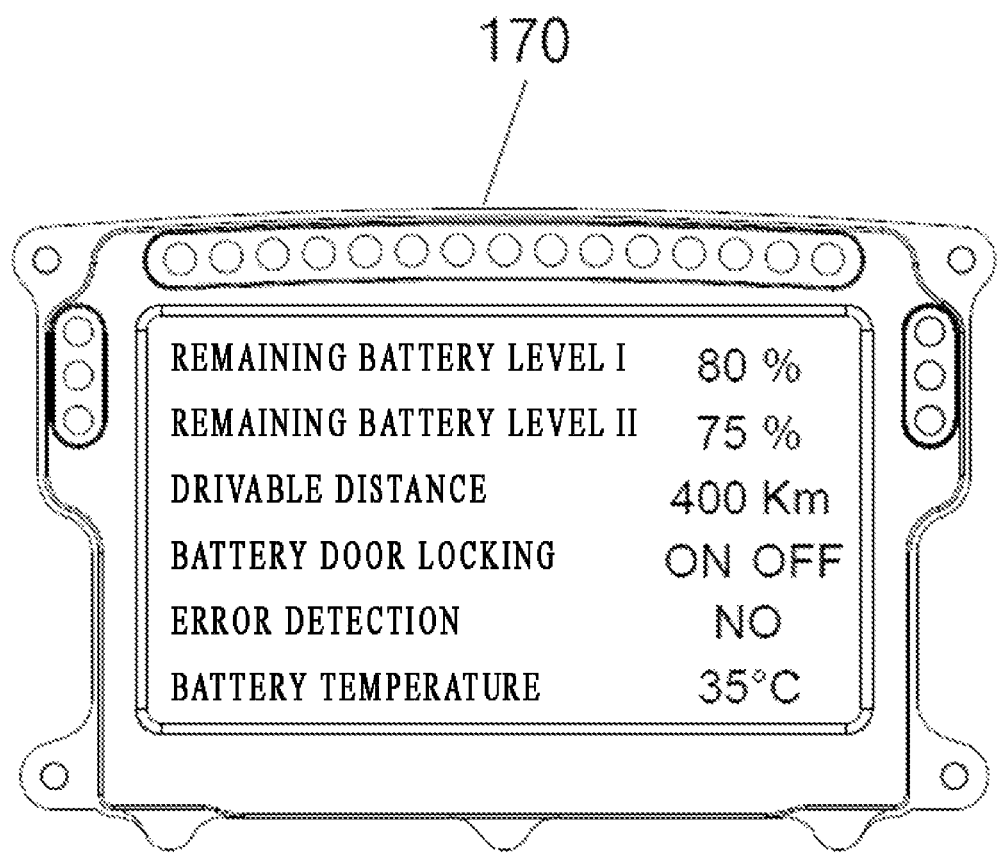
Figure 2C:
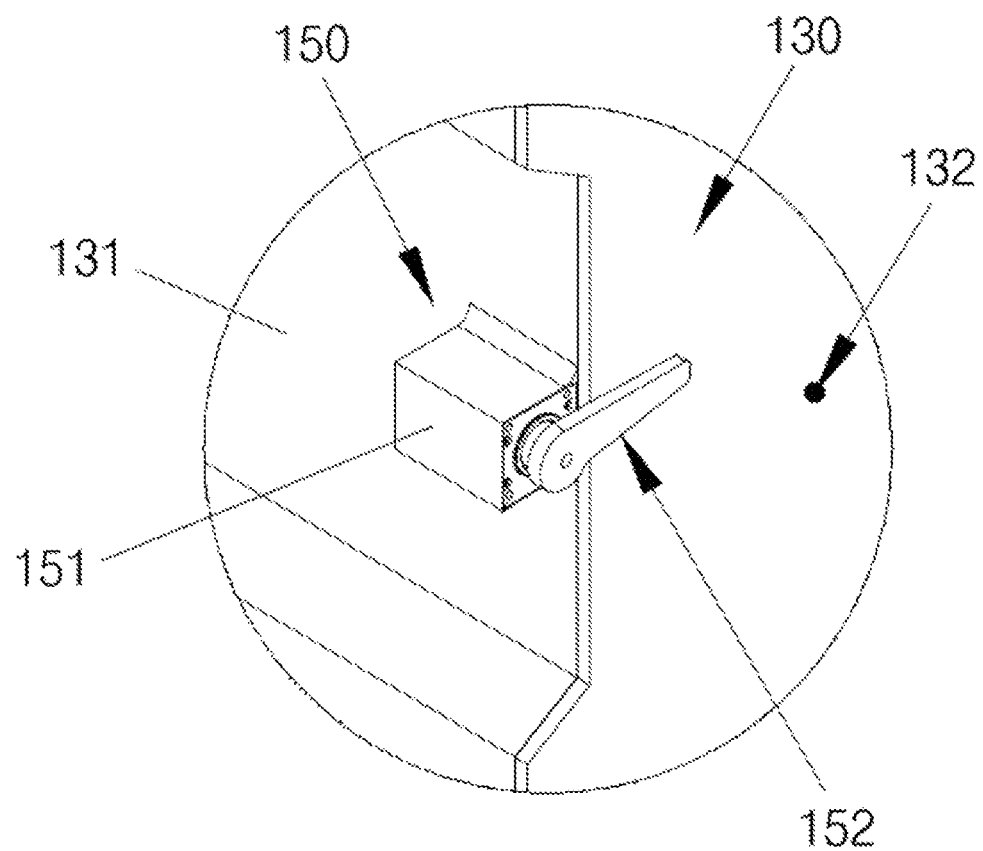
Figure 3:
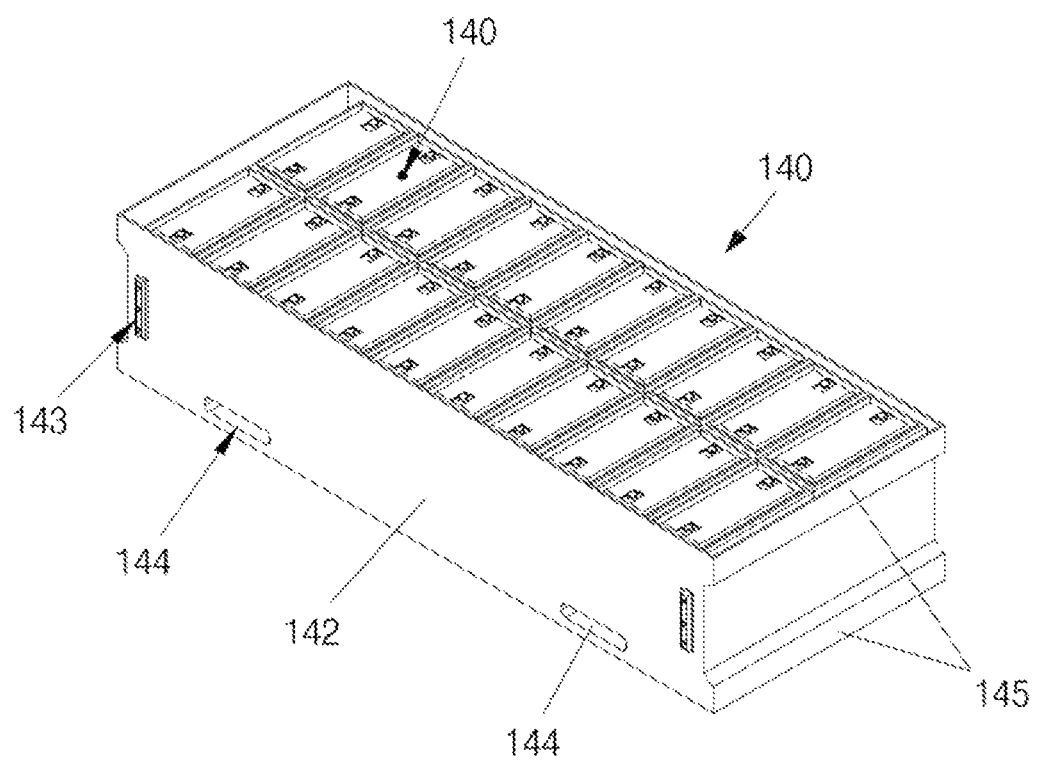
FIG. 3 is a perspective view illustrating a battery module in a container trailer vehicle equipped with a replaceable battery according to an embodiment of the present disclosure.

FIG. 1 is a perspective view illustrating a container trailer vehicle 100 equipped with a replaceable battery according to an embodiment of the present disclosure. FIG. 2A, FIG. 2B and FIG. 2C are views illustrating a battery box 130, a display 170, and a battery door lock 150 in a container trailer vehicle 100 equipped with a replaceable battery according to an embodiment of the present disclosure. FIG. 3 is a perspective view illustrating a battery module 140 in a container trailer vehicle 100 equipped with a replaceable battery according to an embodiment of the present disclosure.

As shown in FIG. 1, FIG. 2A, FIG. 2B, FIG. 2C and FIG. 3, the container trailer vehicle 100 according to the embodiment of the present disclosure comprises a truck 110, a trailer 120, a battery box 130, a battery module 140, a battery door lock 150, an automatic door open actuator 160, a display 170, a generator 180, and a driving motor 190.

The truck 110 comprises an internal combustion engine, a transmission, an axis, and wheels, and allows a driver to ride and drag the trailer 120. In some examples, the truck 110 may include or be referred to as a tractor head. In some examples, the truck 110 may further comprise a control display 111 within the cab to control and monitor the battery module 140.

The trailer 120 comprises a chassis, an axis, and wheels, and may be detachably coupled to the rear end of the truck 110 to be dragged. A container 121 may be mounted on the trailer 120. The trailer 120 may comprise or be referred to as a full trailer or semi-trailer.

The battery box 130 may be installed under the container trailer 120. In some examples, the battery box 130 may be installed in a space between the wheels, which is the lower part of the chassis of the trailer 120. In some examples, the battery box 130 may comprise a case 131 and a door 133. In some examples, the case 131 may have a rectangular parallelepiped shape with one side open, and the door 133 may open or close one side of the case 131.

In some examples, the case 131 of the battery box 130 may further comprise guide grooves 132 installed by extending in the width direction in the upper and lower portions of both sides, respectively. In some examples, each of guide grooves 132 may include a groove extending in an inwardly outward direction.

The battery module 140 may be detachably installed in the case 131 through the door 133 of the battery box 130. In some examples, with the door 133 of the battery box 130 open, the battery module 140 slides in the lateral direction of the case 131, and the battery module 140 may be coupled to the case 131 or separated from the case 131.

In some examples, the battery module 140 may comprise a battery cell 141, a housing 142, a charge/discharge terminal 143, and a lift groove 144. A plurality of battery cells 141 may be provided, and the plurality of battery cells 141 may be electrically connected in series and/or in parallel. The battery cell 141 may include or be referred to as a lithium ion battery, a lithium polymer battery, or a rechargeable secondary battery such as a solid-state lithium battery. The battery cell 141 may include or be referred to as a lithium ion battery, a lithium polymer battery, or a rechargeable secondary battery such as a solid-state lithium battery. The housing 142 may surround the lower side and sides of the battery cell 141. In some examples, the housing 142 may be in the shape of a generally rectangular parallelepiped with an open top. The charging/discharging terminal 143 is installed on the front side of the housing 142 to charge the battery cell 141 or to discharge the battery cell 141. The charging/discharging terminal 143 may be connected to an external charger to charge the battery cell 141. The lift groove 144 is installed in the lower front area of the housing 142, so the forklift may be easily coupled thereto. Accordingly, the forklift can be coupled or separated from the lift groove 144 of the battery module 140, and the heavy battery module 140 can be easily replaced from the battery box 130.

In some examples, the housing 142 of the battery module 140 may further comprise guide protrusion 145 installed in each upper and lower portion of both sides in the width direction. The guide protrusion 145 may comprise a protrusion protruding from the inside to the outside.

Accordingly, the guide protrusion 145 of the battery module 140 may be coupled to or separated from the guide groove 132 of the case 131 in a sliding manner. Due to the mutual coupling of the guide groove 132 and the guide protrusion 145, the battery module 140 in the battery box 130 does not vibrate in the upper and lower and/or left and right directions, thereby improving the mutual coupling force between the case 131 and the battery module 140.

The battery door lock 150 is installed on each side of the battery box 130 to enable the opening and closing of the door 133 from the case 131. That is, when the battery door lock 150 is locked, the door 133 cannot be automatically opened by the automatic door open actuator 160. When the battery door lock 150 is unlocked, the door 133 may be automatically opened by the automatic door open actuator 160.

In some examples, the battery door lock 150 may comprise a lock plate 152, which is coupled to the rotary axis of the electric motor 151 with the electric motor 151 coupled to the side surface of the case 131 to rotate in the forward direction, thereby allowing coupling in the front side of the door 133 or to rotate in the reverse direction, thereby separating from the front surface of the door 133.

The automatic door open actuator 160 is installed on the upper surface of the battery box 130 to automatically open and close the door 133 from the case 131. In some examples, the automatic door open actuator 160 may comprise a pneumatic cylinder. The pneumatic cylinder may comprise a cylinder barrel 161 and a piston rod 162. The cylinder barrel 161 may be coupled to the upper surface of the case 131. The piston rod 162 extends from the cylinder barrel 161 to be coupled to the upper surface of the door 133. In this way, when the battery door lock 150 is unlocked, and the piston rod 162 of the automatic door open actuator 160 moves to the inside the cylinder barrel 161, the lower end of the door 133 moves upward to be opened with the upper end of the door 133 as a rotary axis, and when the piston rod 162 of the automatic door open actuator 160 moves to the outside of the cylinder barrel 161, the lower end of the door 133 moves downward to be closed with the upper end of the door 133 as a rotary axis.

In some examples, the battery box 130 further comprises a temperature sensor. When the temperature of the battery module 140 is higher than the reference temperature while the container trailer vehicle 100 is driving, the battery door lock 150 operates to make the door 133 in an openable state, and then the automatic door open actuator 160 operates to automatically open the door 133. Accordingly, as draft air is directly introduced into the battery module 140, the temperature of the battery module 140 may be lowered.

The display 170 may be installed on the upper portion of the battery box 130 to display the remaining battery amount, the drivable distance, whether the battery door is locked, the number of times of error detection, and/or the battery temperature. To this end, the display 170 may comprise a battery remaining amount calculator unit for calculating the remaining amount by sensing the voltage of the battery module 140; a distance calculator for calculating a drivable distance of the vehicle from the battery remaining amount; a door sensor for sensing whether the battery door is locked; a counter for counting the number of errors in the battery module or locking device; and/or a battery temperature sensor for sensing the temperature of the battery. In some examples, the display 170 may transmit information to the control display 111 installed in the vehicle cab.

Figure 4A:
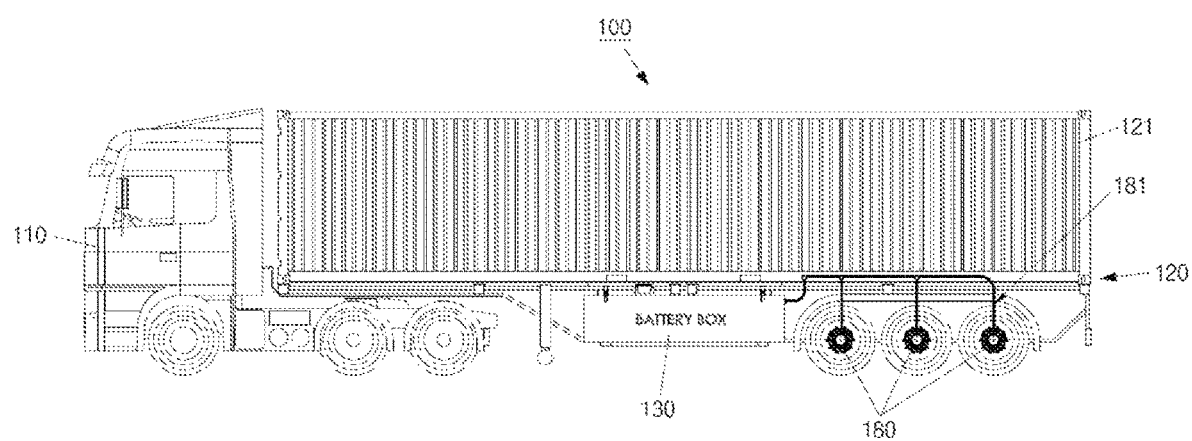
FIG. 4A, FIG. 4B and FIG. 4C are side views illustrating a container trailer vehicle equipped with a replaceable battery and cables according to an embodiment of the present disclosure.
Figure 4B:
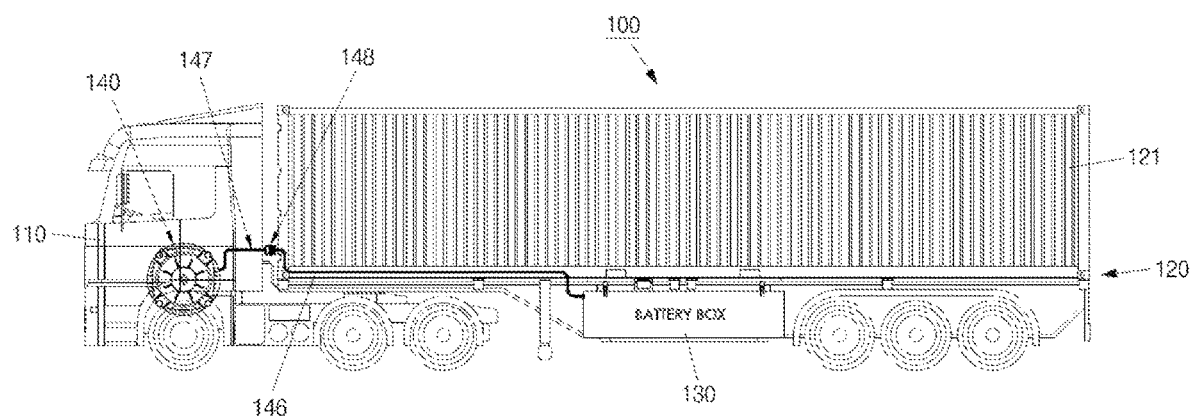
Figure 4C:
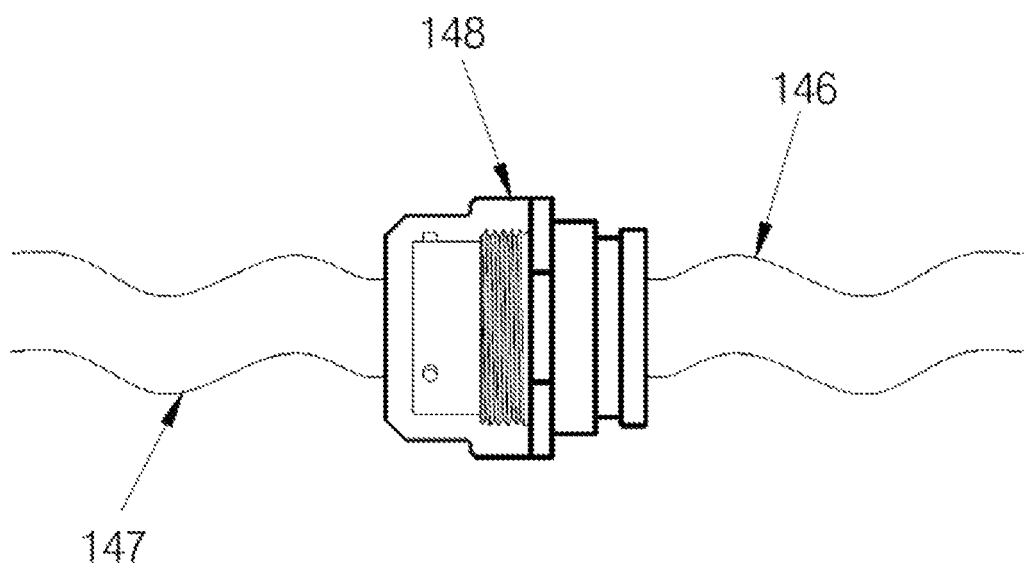

FIG. 4A, FIG. 4B, and FIG. 4C are side views illustrating a container trailer vehicle equipped with a replaceable battery and cables according to an embodiment of the present disclosure.

As shown in FIG. 4A, FIG. 4B, and FIG. 4C, the container trailer vehicle 100 equipped with a replaceable battery according to an embodiment of the present disclosure may further comprise a generator 180 and a driving motor 190. The generator 180 may be installed on the wheels of the container trailer 120 and connected to the battery module 140 with a generator cable 181 to charge the battery module 140. In some examples, the generator 180 may charge the battery module 140 by generating power while regenerative braking when the vehicle 100 is braked. Approximately 98% of the kinetic energy may be recovered by regenerative braking, resulting in only 1 to 2 kW of energy consumption when driving on the highway with a full load. In some examples, the battery module 140 is suitable for the Korean terrain because the maximum driving range that may be run on a single charge is about 700 to 1000 km. The driving motor 190 is installed on each axle of the truck 110 connected to the container trailer 120 and axle of the container trailer 120 so that the battery module 140 may rotate both axles. In some examples, the battery module 140 may only power the drive motor 190 connected to the axle of the truck 110. In some examples, the battery module 140 may only supply power to the drive motor 190 connected to the axle of the trailer 120. In some examples, the battery module 140 may power both a drive motor 190 coupled to the axle of the truck 110 and a drive motor 190 coupled to the axle of the trailer 120. Therefore, the embodiment of the present disclosure can minimize the operation of the engine and the transmission of the truck 110 to save energy and suppress the generation of $CO_2$.

In some examples, the truck 110 may further comprise a battery cable 146 connected to the battery module 140, motor cable 147 connected to drive motor 190 installed on the axle of truck 110, and a cable connector 148 enabling mutual coupling or separation between the battery cable 146 and the motor cable 147. Accordingly, when the vehicle 100 is driven while being separated from the trailer 120, the vehicle 100 may be separated from the battery module 140 of the trailer 120 by the cable connector 148.

Figure 5:
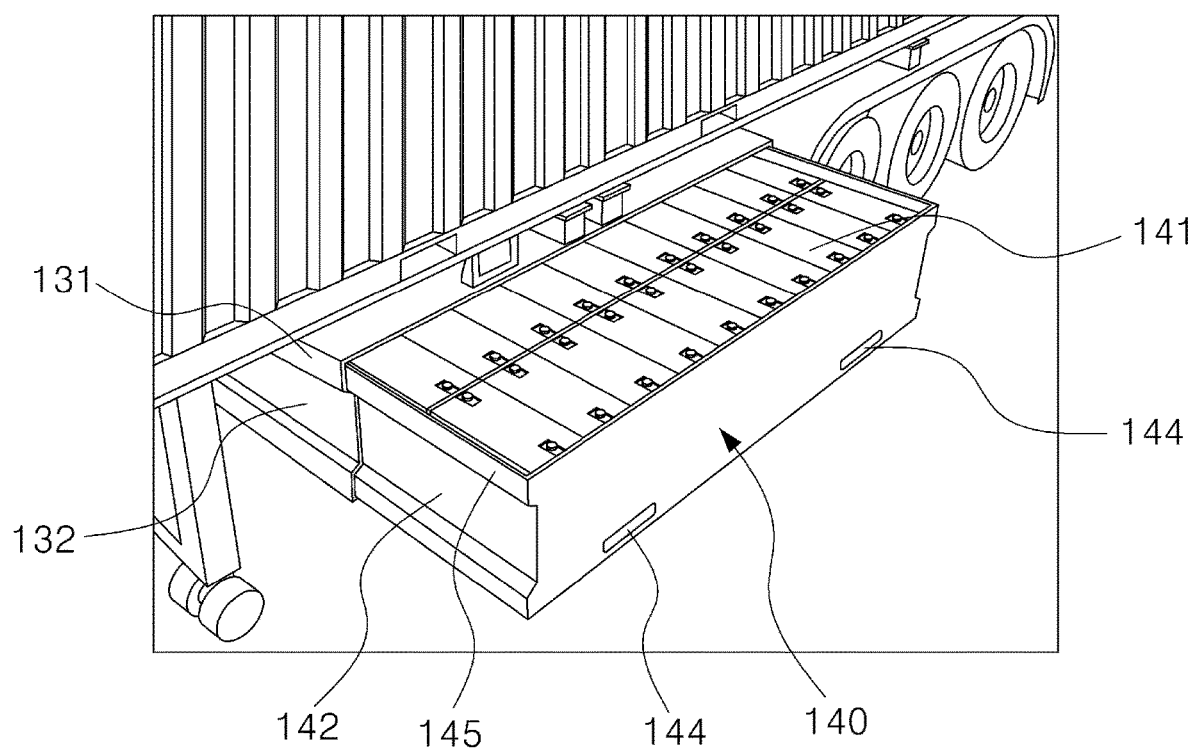
FIG. 5 is a perspective view illustrating a battery module coupled to a battery box of a container trailer vehicle equipped with a replaceable battery according to an embodiment of the present disclosure.

FIG. 5 is a perspective view illustrating a battery module 140 coupled to a battery box 130 of a container trailer vehicle 100 equipped with a replaceable battery according to an embodiment of the present disclosure.

As shown in FIG. 5, the battery module 140 may be coupled or separated from the battery box 130 slidingly. During this couple and separation operation, the battery box 130 is provided with a guide groove 132 in the width direction on each of the upper and lower sides of the side, and the battery module 140 is provided with a guide protrusion 145 in the width direction on each of the upper and lower sides of the side. Accordingly, the guide protrusion 145 of the battery module 140 is coupled to the guide groove 132 of the battery box 130, so they can be easily coupled or separated in a sliding manner. Furthermore, a pair of lift grooves 144 are provided at approximately the lower portion of the battery module 140. Accordingly, the forklift is coupled to the lift groove 144, so the battery module 140 may be easily coupled or separated from the battery box 130.

In this way, the embodiment of the present disclosure provides a container trailer vehicle 100 equipped with a replaceable battery, thereby increasing the mileage of the container trailer vehicle 100 and solving the problem of a long charging time. Sufficient battery space is secured so that a battery with a low energy density can be used. Accordingly, it is possible to lower the manufacturing cost of the vehicle 100 and to make it possible to use the heating of the cab or various electronic devices without turning on the engine, thereby supplying power to the container with the cooler.

Figure 6:
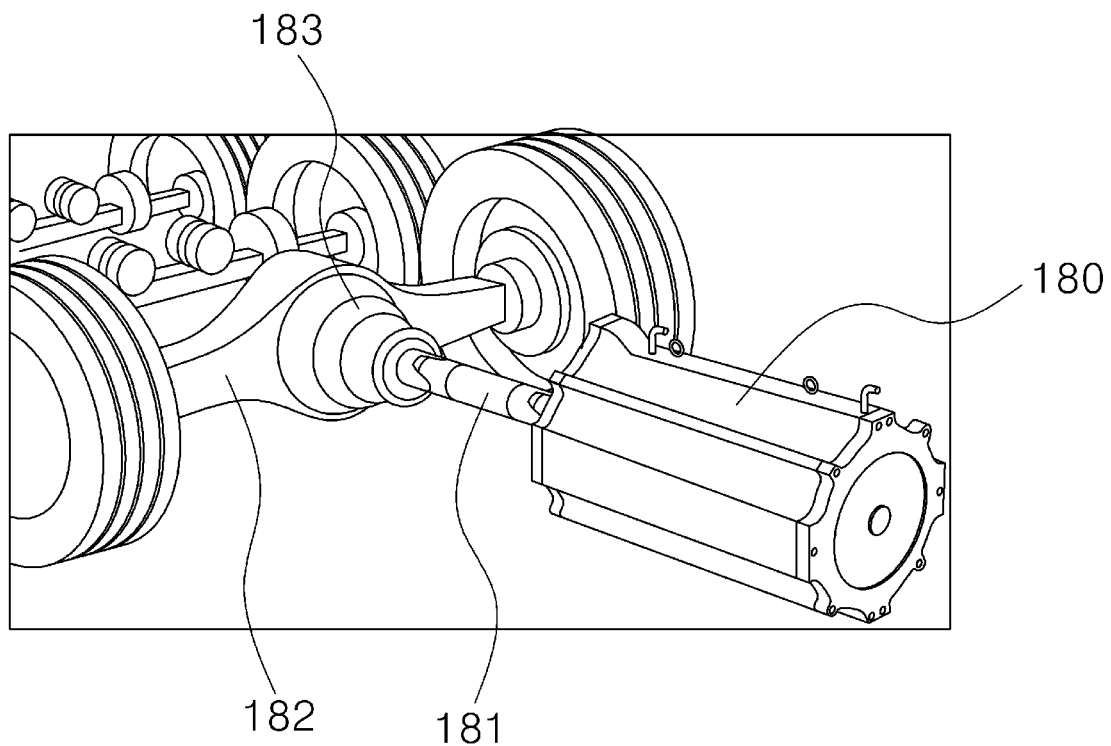
FIG. 6 is a perspective view illustrating an example of a generator in a container trailer vehicle equipped with a replaceable battery according to an embodiment of the present disclosure.

FIG. 6 is a perspective view illustrating an example of a generator in a container trailer vehicle equipped with a replaceable battery according to an embodiment of the present disclosure.

As shown in FIG. 6, the generator 180 is gear-coupled to the rotary axle 181 coupled to the wheel axle 182 (the wheel axle is on the inside of the structure), thereby generating electricity. For example, the rotary axle 181 may be connected to the gear device 183 selectively coupled and separated from the wheel axle 182. For example, when the driver steps on the accelerator pedal, the gear device 183 separates the wheel axle 182 and the rotary axle 181 to prevent the generator 180 from operating. As another example, when the driver steps on the deceleration pedal, the gear device 183 connects the wheel axle 182 and the rotary axle 181 to operate the generator 180, resulting in regenerative braking of the vehicle, and at this time, the generator 180 operates to charge the battery module 140.

The above description is only one embodiment for implementing a container trailer vehicle equipped with a replaceable battery according to the present disclosure, and the present disclosure is not limited to the above embodiment. As claimed in the following claims, the technical spirit of the present disclosure will cover the extent that various modifications can be made by anyone with ordinary knowledge in the field to which the invention pertains without departing from the gist of the present disclosure.

What is claimed is:

1. A container trailer vehicle equipped with a replaceable battery, comprising:
    a battery box installed with a case and a door at the bottom of the container trailer;
    a battery module detachably installed in the case through the door of the battery box;
    a battery door lock installed on a side of the battery box to enable opening and closing of the door from the case;
    an automatic door open actuator installed on an upper surface of the battery box to automatically open and close the door from the case;
    a display installed on an upper part of the battery box to display a remaining battery level, a drivable distance, whether the battery door is locked, the number of times of error detection, and a battery temperature;
    a generator installed on a wheel of the container trailer to charge the battery module; and
    drive motors respectively installed on an axle of the truck connected to the container trailer and an axle of the container trailer to rotate the axles by the battery module, wherein the battery door lock comprises:
    an electric motor coupled to the side of the case; and
    a lock plate coupled to a rotary axle of the electric motor to be coupled to or separated from a front surface of the door, wherein the automatic door open actuator comprises a pneumatic cylinder, the pneumatic cylinder comprising: a cylinder barrel coupled to an upper surface of the case; and a piston rod extending from the cylinder barrel and coupled to an upper surface of the door, wherein if the battery door lock is locked, the door cannot be automatically opened by the automatic door open actuator and, if the battery door lock is unlocked, the door can be opened by the automatic door open actuator, wherein the battery box further comprises a temperature sensor, and when a temperature of the battery module is higher than a reference temperature while the container trailer vehicle is running, the battery door lock operates to make the door openable, and then the automatic door open actuator operates to automatically open the door.

2. The container trailer vehicle of claim 1, wherein the battery module comprises:
    a plurality of battery cells connected in series or in parallel;
    a housing surrounding the battery cells;
    a charging/discharging terminal installed in the housing to charge the battery cells or to discharge the battery cells; and
    a pair of lift grooves installed in a lower part of the housing to couple a forklift.

3. The container trailer vehicle of claim 1, wherein the case of the battery box further comprises a guide groove installed in the width direction on each of an upper part and a lower part of a side thereof, and the housing of the battery module further comprises a guide protrusion installed in the width direction on each of an upper part and a lower part of a side thereof, and
    wherein the guide protrusion of the housing of the battery module is coupled to the guide groove of the case of the box.

4. The container trailer vehicle of claim 3, wherein the guide groove is provided with a groove from the inside to the outside, and the guide protrusion is provided with a protrusion from the inside to the outside.

5. The container trailer vehicle of claim 1, further comprising:
    a battery cable connected to the battery module;
    a motor cable connected to a drive motor installed on the axle of the truck; and
    a cable connector coupling or separating the battery cable and the motor cable from each other.

6. The container trailer vehicle of claim 1, wherein the generator is connected to a rotary axle coupled to the wheel axle of the trailer through a gear device, and
    when a driver steps on an accelerator pedal, the gear device separates the wheel axle and the rotary axle to prevent the generator from operating, and when the driver steps on a decelerator pedal, the gear device couples the wheel axle and the rotary axle to operate the generator.

* * * * *